United States Patent
Eurisch et al.

[11] Patent Number: 5,947,595
[45] Date of Patent: Sep. 7, 1999

[54] KITCHEN UTENSIL, IN PARTICULAR A STIRRER

[75] Inventors: Hans Eurisch; Erhard Schäfer, both of Marktoberdorf, Germany

[73] Assignee: Rösle Metallwarenfabrik GmbH & Co., KG, Germany

[21] Appl. No.: 09/031,382

[22] Filed: Feb. 26, 1998

[30] Foreign Application Priority Data

May 7, 1997 [DE] Germany .......................... 297 08 245

[51] Int. Cl.⁶ .............................. A47J 43/10; A47J 43/28
[52] U.S. Cl. ............................. 366/129; 99/348; 366/343
[58] Field of Search ................... 99/348, 510; 366/129, 366/130, 342, 343, 344; 416/69, 70 R, 227 R, 231 R, 231 A, 231 B, 235; 15/141.1, 141.2; D7/376–380, 412, 688, 690; 426/519

[56] References Cited

U.S. PATENT DOCUMENTS

| | | |
|---|---|---|
| 843,461 | 2/1907 | Husser ................................ 366/129 X |
| 1,195,839 | 8/1916 | Moses ........................................ 99/348 |
| 1,213,561 | 1/1917 | Walker ............................... 366/342 X |
| 1,410,522 | 3/1922 | Ziemba ............................... 366/129 X |
| 1,617,787 | 2/1927 | Andrews, Jr. . | 
| 1,722,104 | 7/1929 | Miner . |
| 1,960,089 | 5/1934 | Rabb .......................................... 99/348 |
| 1,986,163 | 1/1935 | Rockwell ............................ 366/129 X |
| 2,023,451 | 12/1935 | Vaughn . |
| 2,499,074 | 2/1950 | Nordgarden ............................ 366/343 |
| 2,836,402 | 5/1958 | Barnes et al. . |
| 5,219,223 | 6/1993 | Scmitt .................................. 416/69 X |
| 5,688,045 | 11/1997 | Butte ....................................... 366/129 |
| 5,725,305 | 3/1998 | Delbo .................................. 416/70 R |

FOREIGN PATENT DOCUMENTS

| | | |
|---|---|---|
| 0475059 | 3/1992 | European Pat. Off. . |
| 842253 | 9/1951 | Germany . |
| 861913 | 11/1952 | Germany . |
| 1666681 | 11/1953 | Germany . |
| 1765135 | 4/1958 | Germany . |
| 8405668 | 2/1984 | Germany . |
| 8433056 | 1/1985 | Germany . |
| 4026835 | 2/1992 | Germany . |
| 321868 | 11/1929 | United Kingdom . |

*Primary Examiner*—Timothy F. Simone
*Attorney, Agent, or Firm*—Baker & Botts, L.L.P.

[57] ABSTRACT

A kitchen utensil comprises a handle part (12), a shank part (14) adjacent to the handle part (12) and an active part (16) adjacent to the shank part (14), a transition part (18) being arranged on the shank part (14) at a distance from the handle part (12), and at least one component (28, 30) of the shank part (14) entering into an accommodating space (52, 54) inside the transition part (18). The entrance opening (53, 55) of the accommodating space (52, 54) for the component (28, 30) of the shank part is substantially of like cross-section with that component (22, 26, 28, 30) in the region of the entrance (53, 55).

33 Claims, 5 Drawing Sheets

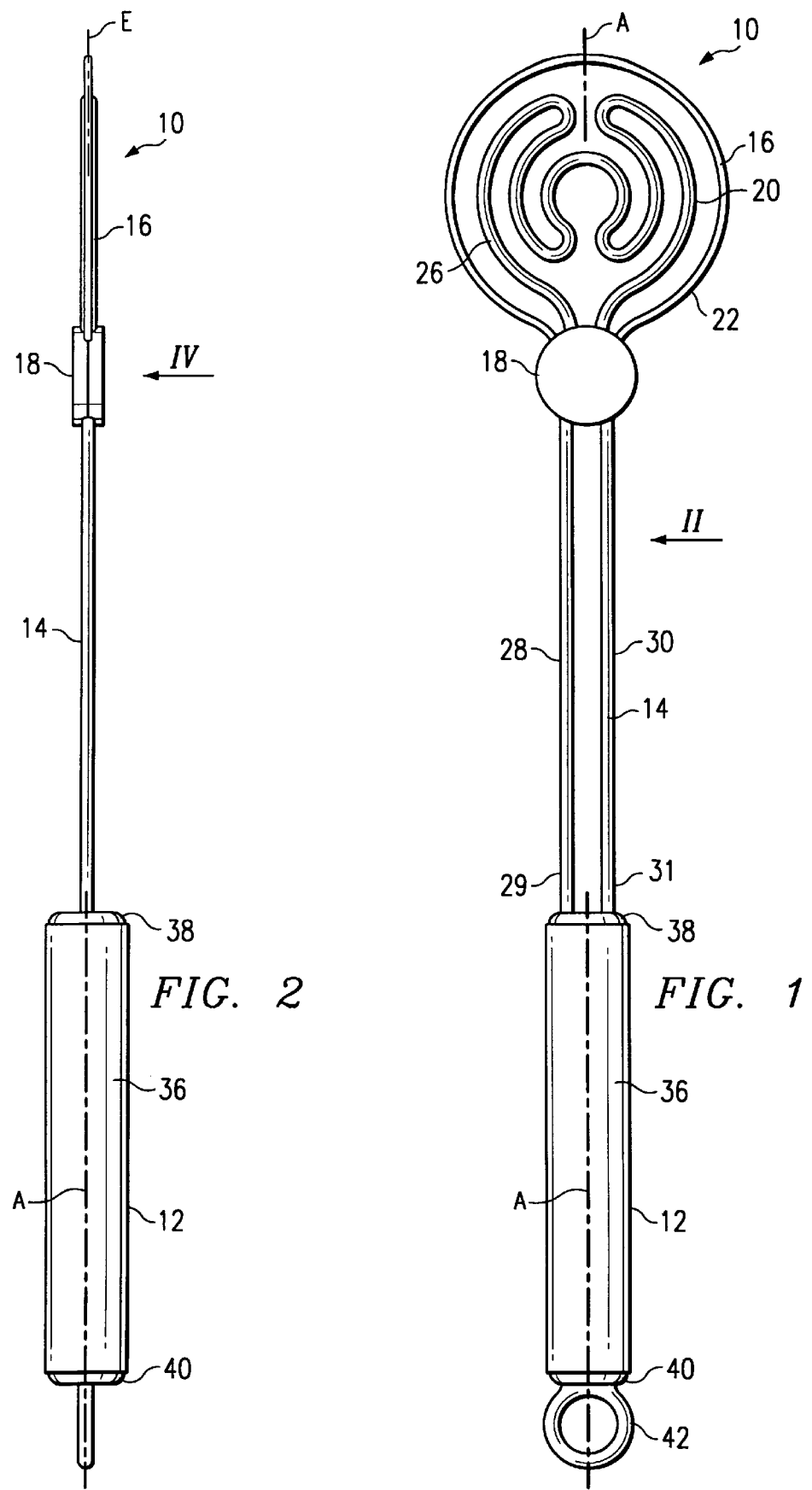

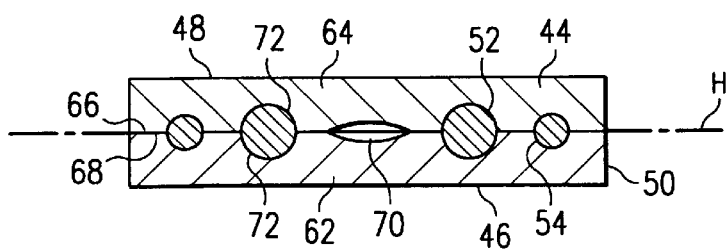
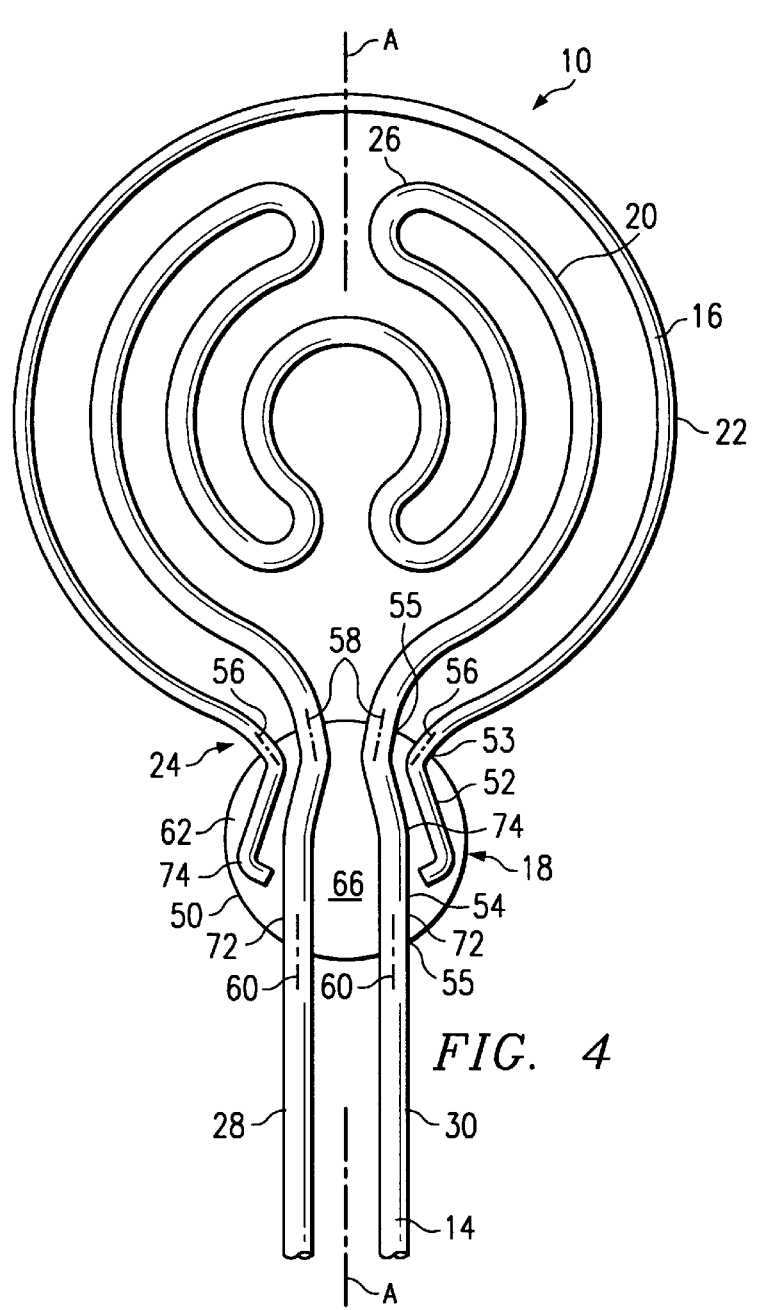
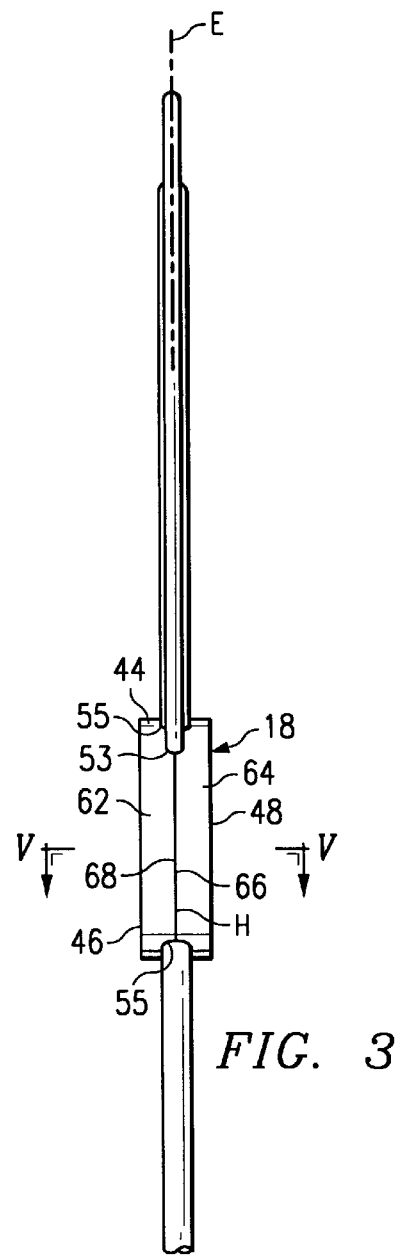

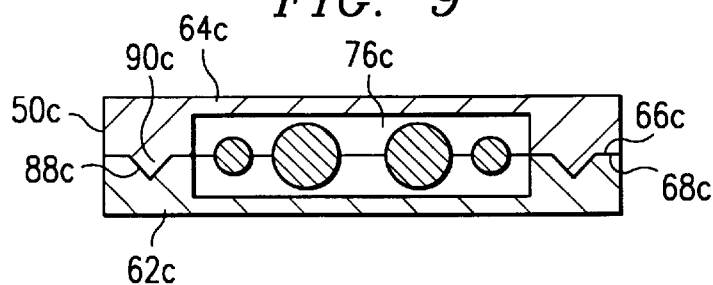
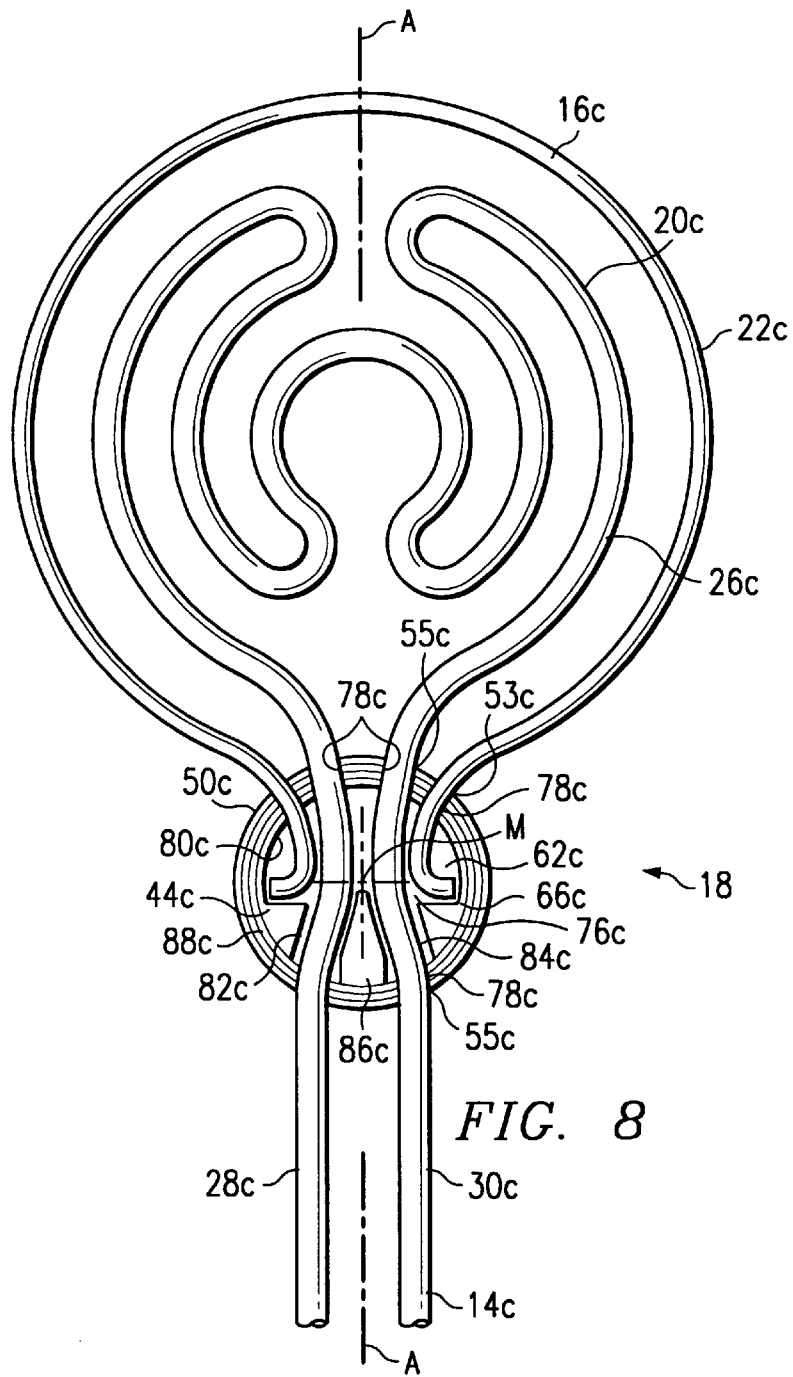

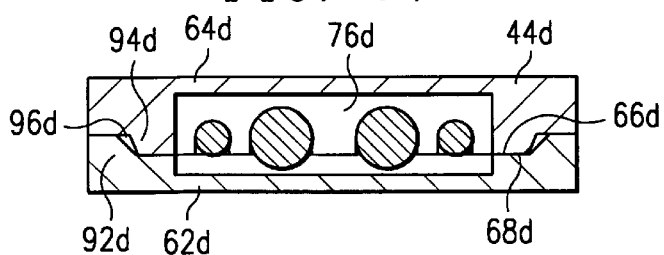
FIG. 11
FIG. 10
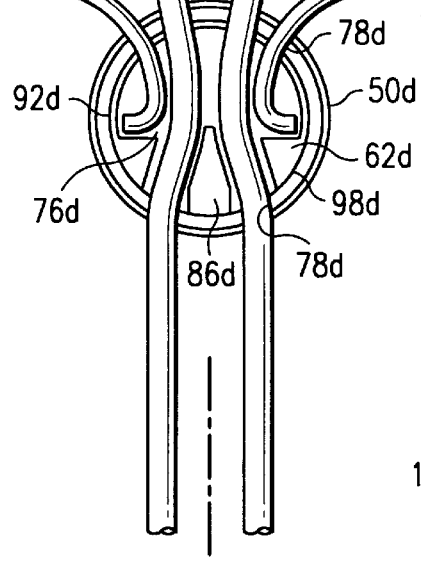
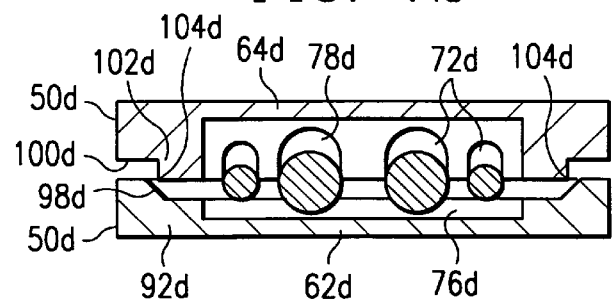
FIG. 12

KITCHEN UTENSIL, IN PARTICULAR A STIRRER

FIELD OF THE INVENTION

The invention relates to a kitchen utensil, in particular a stirrer, comprising a handle part, a shank part adjacent to the handle part, and an active part, for example a stirring element, adjacent to the shank part, a transition part, in particular for stabilizing or/and connecting purposes, being arranged between the shank part and the active part, and at least one component of the shank part or/and at least one component of the active part entering into an accommodating space inside the transition part.

BACKGROUND OF THE INVENTION

Such a kitchen utensil is disclosed in European Patent 0,475,059 B1. Reference is there made in particular to FIGS. 12 and 13, where in the region of transition between the shank part and the active part—the active part there takes the form of a paddle made up of wire material—a transition part is provided. This transition part—as may be seen from FIG. 11—takes the form of a wire clamp so enveloping the wire forming the shank part that, alongside the cross-sections of the wires forming the shank, there are cavities in the enveloped space. These cavities may fill with sauces or liquid dough or other material of low viscosity during work in the kitchen, and can then no longer be cleaned, or cleaned only with great difficulty.

SUMMARY OF THE INVENTION

The object of the invention is so to constitute a kitchen utensil of the kind initially defined that the danger of penetration of thinly viscous substances into cavities is avoided and cleaning of the utensil is readily possible.

To accomplish this object, according to the invention, it is proposed that the entrance opening of the accommodating space for the component in question be substantially of like cross-section to the cross-section of that component in the entrance region.

Given the conformation of the kitchen utensil according to the invention, no cavity openings remain through which food remnants can penetrate into cavities. The kitchen utensil according to the invention is therefore far superior to the previously known utensil in point of hygiene.

Other features of the invention will appear from the dependent and independent subsidiary claims.

It is possible that at least one component, in particular at least one wire component, may extend through the transition part and participate in the formation of both the shank part and the active part. Alternatively, however, it is possible that the shank part and the active part may be connected to each other by the transition part exclusively. In the latter case, there is increased freedom of design in the conformation of the shank part and the active part.

If the shank part is made of wires it is often desirable to employ only a few wires to make up the shank part, for example two wires, arranged at an appreciable distance from each other to permit cleaning. On the other hand, in the manufacture of the active part from wire to achieve a sufficient stirring effect, it is often desirable to use more individual pieces of wire in the active part than are desired to form the shank part. The invention permits the number of components of the shank part entering the transition part to be different from the number of components of the active part entering the transition part from the active part end.

Thus the number of components of the shank part entering the transition part from the end can be kept smaller than the number of components of the active part entering the transition part from the active part end. Free ends of wire, which may lead to danger of injury or of bending, are therefore absent outside of the transition part.

The use of the transition part also permits the use, when the shank part and the active part are each made of wire material, of different cross-sectional forms, in particular different diameters of wire, for the active part and the shank part. Thus for example wire material of larger cross section may be used to form the shank part, and wire material of smaller cross-section, at least in part, adapting better to the particular inner shape of a saucepan or a mixing bowl, to form the active part.

As described in the prior art according to the above mentioned EP 0,475,059 B1, the transition part may be displaceable along the shank part. In this way, as described in the prior art, the flexibility of portions of the stirring utensil can be controlled. According to the invention, it has been contemplated also that the transition part may be invariable in its distance from the handle part. Again, even at a fixed distance from the handle part, the transition part may perform various functions, such as stabilization of the utensil as a whole against bending and twisting; or connecting of a shank part to an active part when different materials are used for the shank part and the active part. If desired, it is also possible to install a temperature sensor in the transition part, measuring the temperature of the material subjected to the stirring operation by the utensil. The temperature determined by this sensor may then be transmitted for example by way of the shank part, which again may consist of two wires, to an indicating means, which may for example be accommodated in the handle part. If a fixed connection of a component, as, say, a wire component of the shank part and/or of the active part to the transition part is desired, such a connection may for example be produced by giving the component in question a course deviating from the direction of entry at the entrance to the particular accommodating space inside the transition part. The deviating course may for example consist of a kink or constriction in the wire material.

If a stirrer of conventional form is to be created, essentially all components of the active part and also all components of the shank part if desired may be allowed to enter the transition part in one plane. If on the other hand a spatially formed kitchen utensil, for example a whisk, is to be provided, conceivably the several components of the active part and/or the shank part may be allowed to enter the transition part in various directions outside of any common plane.

The utmost safety against penetration of cooking material into cavities no longer accessible to cleaning exists if the accommodating space inside the transition part is essentially completely filled by the components in question.

According to a preferred embodiment of the invention, provision is made for the transition part to be made up of at least two members connected together in contact with each other on connecting surfaces facing each other, a relief-like recess being formed in at least one of said connecting surfaces to form an accommodating space. This relief-like accommodating space may in principle be produced at the time of assembly by compression of the two members, enclosing the components to be joined. Preferably, to be sure, the accommodation spaces or their parts will have been preformed for the components in the respective connecting surfaces at the time of production of the members. An important point is as exact as possible an adaptation of the cross-sections of the components of the active part and/or the shank part to the relief-like recesses in the connecting surfaces, so that no stray cavities can form. An exact adaptation of the recesses to the shape of the respective components of the active part and the shank part may be achieved in that the recesses in the members are already molded in the connecting surfaces at production of said members, or impressed in the connecting surfaces at the production of the members.

The connecting of the members to each other may be accomplished by bonding, soldering or welding. In any case, it is desirable, for maintaining maximum stability and securing of connection between the active part and the shank part, to incorporate the components of the active part and the shank part to be joined at the transition part in the bonded, soldered or welded connection.

Welding and soldering are preferred. Bonding is possible in principle, however, if use is made of an adhesive that will withstand the temperatures occurring in kitchen practice, including washing.

It is also of utmost importance that the transition parts be amenable to contact and to cleaning, so that they do not present any danger to the persons using the utensil in question, and moreover can be easily, carefully and completely cleaned on their exposed surfaces as well.

It is recommended that the transition part, especially when the utensil is intended for the purpose of stirring, be of such conformation that it enhances the stirring effect. This means that the principal plane of the transition part will be arranged essentially coplanar with or parallel to the plane of an active part having the conformation of a paddle.

Preferably, all parts of the utensil are made of stainless steel. If the transition part is composed of two members, these members may be cast in stainless steel, the relief-like recesses for the spaces accommodating the wires or other components being molded in at the time of casting. The two members may then be assembled, with insertion of the components, in particular wire components, and welded or soldered or bonded together, where the wire components may be incorporated in the particular soldered, welded or bonded connection at the time of welding, bonding or soldering. The retention is then effected not merely by the geometrical connection between the kinked or constricted wires and the cavities geometrically adapted to and accommodating them, but additionally by the welding, bonding or soldering.

In principle, it is possible alternatively to connect the transition parts to the shank and/or to the active part by casting or injection molding around the components of the shank part and the active part to form the transition part. To be sure, this latter mode of production requires high-precision molds, which—since they are pervaded by the connecting parts of the shank or the active part—must be subsequently destroyed. Assembling the transition parts out of two or more members is therefore preferable by far.

To fabricate the transition parts with highest quality of surface, it is recommended that the finishing of the exposed surfaces be done after connection of the members as by polishing. If the material used to make the utensils is stainless steel, polishing is regularly the last step of surface treatment. If less costly material is used, conceivably an e.g. galvanic coating might become the last step of surface treatment.

DESCRIPTION OF THE DRAWINGS

The accompanying figures illustrate the invention in terms of embodiments by way of example:

FIG. 1 represents a view of a kitchen utensil, namely a stirrer, according to the invention;

FIG. 2, a view of the stirrer in the direction of the arrow II in FIG. 1;

FIG. 3, an enlarged view corresponding to FIG. 2 of the active part and the transition part of the stirrer;

FIG. 4, a view of an intermediate product during manufacture of the utensil;

FIG. 5, an enlarged section of the finished utensil at the line V-V in FIG. 3;

FIG. 8, an enlarged view, similar to FIG. 4, of another embodiment of an intermediate product;

FIG. 9, a section corresponding to FIG. 5 of a finished utensil, of the intermediate product shown in FIG. 8;

FIG. 10, an enlarged view, corresponding to FIG. 8, of another preferred embodiment of an intermediate product;

FIG. 11, a section, corresponding to FIG. 9 of a finished utensil, of the intermediate product shown in FIG. 10; and, FIG. 12, a section of two halves, according to the invention, of an intermediate product of the finished utensil shown in FIG. 11, before welding.

DESCRIPTION OF THE EMBODIMENTS

Figure 6:
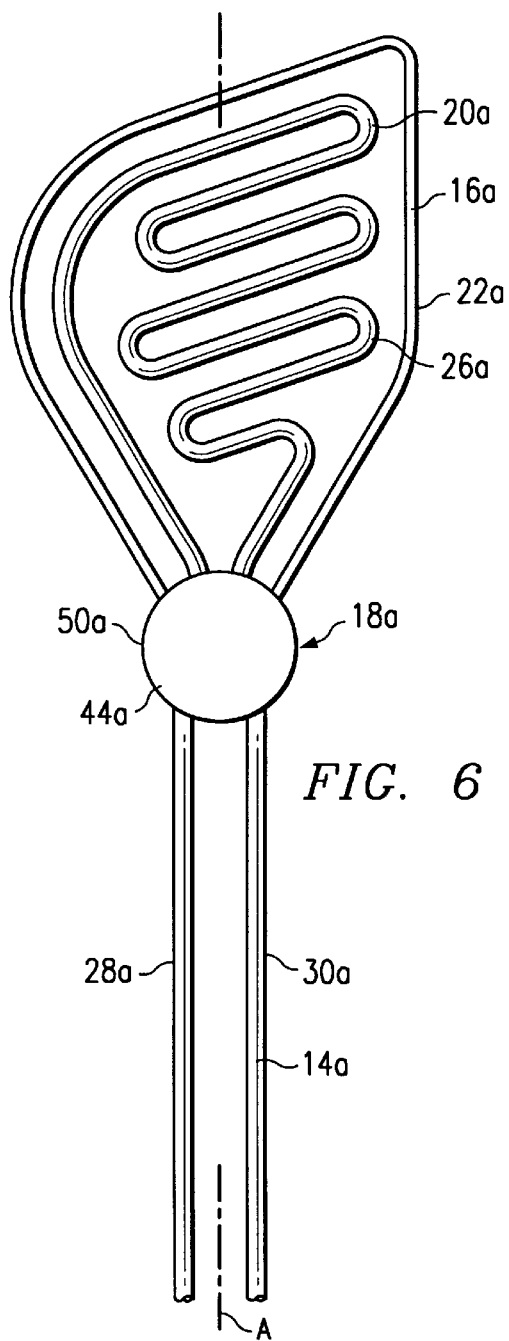
FIGS. 6 and 7, other embodiments of the utensil.

In FIG. 1, we see a kitchen utensil according to the invention in the form of a stirrer, generally designated 10. The stirrer 10 comprises a handle 12 with centerline A, a shank 14 adjoining the handle 12, and an active part 16 in the form of a paddle connected to the shank 14, a disk-shaped transition part 18, hereinafter referred to as a medallion, being provided in the region of transition between the shank 14 and the paddle part 16.

The paddle part 16 comprises a central paddle portion 20 formed of wire material with wound cross-section and an enveloping wire loop 22 prefixed to the periphery of the central paddle portion 20 with continuous lines of engagement to interact with boundary surfaces of a vessel not shown, as for example a bowl or a saucepan. The enveloping wire loop 22 is essentially circular in shape, tapering droplike towards the medallion 18 (at 24), and is fixed in the medallion 18. The central pedal portion 20 in this embodiment comprises a one-piece central wire pass 26, traversing the medallion 18 and connected in one piece to two wire members 28 and 30 of the shank 14, extending parallel to the centerline A of the handle.

The central wire pass 26 lies in a common plane E with the enveloping wire loop 22. The enveloping wire loop 22 preferably has a smaller cross-section of material than the central wire pass 26 and the wire members 28, 30.

The wire members 28, 30 have their paddle part 16 in the same plane E, and the two ends 29, 31 of their members away from the paddle part are anchored in the handle 12. The handle 12 consists of a cylindrical stainless steel tube 36 whose ends are each closed by a cap-like termination 38, 40 pressed into place. The ends 29, 31 of the wire members 28, 30 away from the paddle part are accommodated in matching holes in the termination 38 towards the paddle part, whereas the termination 40 away from the paddle part is provided with a hanger loop 42, accommodated and anchored by an extension, not shown, in a corresponding recess in the termination 40. The hanger loop 42 preferably lies in one plane with the paddle part 16 and the wire members 28, 30 of the shank 14, which members may be anchored in the handle by a casting compound.

The medallion 18 takes the form of a circular disk member 44, having two substantially plane and mutually parallel end surfaces 46, 48 and a periphery 50 orthogonal to the end surfaces 46, 48. In the vertical mid-region H of the disk member 44, accommodating spaces in the form of recesses 52 and passages 54 are made for the wires of the enveloping wire loop 22 and the central wire tier 26 and that of the shank 14, entrance openings 53, 55 of the recesses 52 and/or passages 54 lying in the peripheral surface 50. These passages 54 lead from the paddle end periphery 50 through the disk member 44 to the shank end surface 50, whereas the recesses 52 terminate in the disk member 44. As is seen in FIG. 4, the centerlines 56, 58 of the recesses 52 and passages 54 of the disk member 44 diverge in the peripheral region of the disk member 44 near the paddle, whereas the centerlines 60 of the passages 54 are parallel to the centerline A of the handle in the peripheral surface region of the disk member 44 away from the panel.

The disk member 44 consists of two disk halves 62 and 64, securely connected together, in contact with each other by two facing connecting surfaces 66 and 68, by a central lens-shaped spot weld 70, the connecting surfaces 66, 68 of the two disk halves 62, 64 approximately coinciding with the mid-plane of the disk, or the mid-height range H of the disk member 44. The connecting surfaces 66, 68 exhibit relief-like depressions 72, each of which approximately matches the half-cross-section of the wire material of the enveloping loop 22 and of the central wire layer 26, and the wire members 28 and 30, and in assembled condition form the recesses 52 and passages 54. Here it is of the essence of the invention that the recesses 52 and passages 54 for the particular wire components are substantially of like cross-section with the wire component in question, to prevent entry of foreign matter and remnants of food and ensure a firm seating of the several components.

As may be seen especially in FIG. 4, the recesses 52 and passages 54 for the wire components take a course inside the disk member 44 deviating from the direction of entry into the corresponding accommodating space 52 or 54, as the case may be, at the entrance opening 53, 55, in particular forming one or more kinks 74 or constrictions in said course, thus precluding any displacement of the disk member 44 towards the centerline A of the handle and ensuring that the enveloping wire loop 22 is immovably connected to the disk member 44.

To ensure a secure connection of the disk halves 62, 64 to the wire material, additional spot welds may be provided or the two disk halves 62, 64 may be areally welded, soldered or bonded together, in which case additional kinks 74 or constrictions in the disk member 44 may be dispensed with.

FIGS. 6 to 10 show additional embodiments, where analogous parts bear the same reference numerals, suffixed with letters a, b, c or d.

Figure 7:
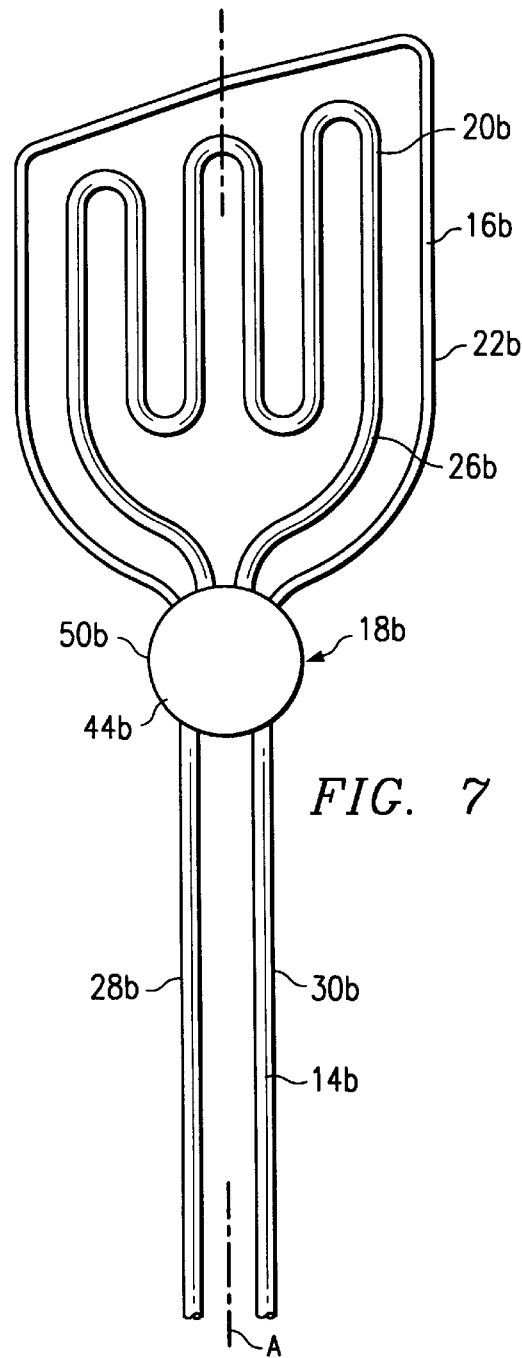

The embodiments of the stirrer according to FIGS. 6 and 7 differ from the stirrer 10 of FIGS. 1 to 5 only by different paddles 16a and 16b.

The embodiment of the disk member 44c of FIGS. 8 and 9 differs from the disk member 44 of FIG. 4 by a different conformation of the connecting surfaces 66c, 68c and the spaces accommodating the wires of the enveloping loop 22c, the central layer 26c and the shank 14c. Thus in FIG. 8, only the accommodating spaces near the periphery, i.e. the entrance openings 53c, 55c and passages 78c adjoining them, which open into an inner chamber 76c of the disk member 44, are substantially of like cross-section with the corresponding wire components, whereas the accommodating space or interior 76c in the central region of the disk member 44c, or the region away from the periphery, has a shape departing from the cross-section of the corresponding wire component.

The interior space 76c of the disk member 44c has two differently shaped regions. The region near the paddle part has the shape of a semicircle 80c extending concentrically with the peripheral surface 50c of the disk member 44c, whereas the region near the shank has two recesses 82c, 84c diverging towards the peripheral surface 50c near the shank part, which are separated from each other by a web 86c. Thus the web 86c extends from the end of the interior space 76c near the shank in axial direction A substantially as far as the center M of the disk member, the web 86c being tapered down.

As may be seen, the wire components—as in the embodiment of FIG. 4—take a course inside the disk member 44c deviating from the direction of entering at the entrance opening 53c, 55c into the interior 76c, precluding displacement of the disk member 44c towards the centerline A of the handle and fixing the enveloping wire loop 22c immovably in the disk member 44c.

To achieve a secure seating and reliable sealing of the disk member 44c, one of the two disk halves 62c is provided in the marginal region of its connecting surface 66c with a concentrically extending annular groove 88c, and the other disk half 64c is provided in the marginal region of its connecting surface 68c with a concentrically extending annular wedge 90c, so that when the two connecting surfaces are in mutual contact, an engagement of the annular wedge 90c in the matching wedge-shaped groove 88c is achieved. Here provision is made for the two disk halves 62c, 64c to be welded together in the region of the wedge-and-groove connection 88c, 90c. Additionally, the two disk halves 62c, 64c may be welded together also in the region of the web 86c, and the annular wedge 90c and wedge-shaped groove 88c may have any external contours provided a secure connection and fusion upon welding are ensured.

FIGS. 10 to 12 show another preferred embodiment. This embodiment differs from the disk member 44c of FIGS. 8 and 9 by a different conformation of the connecting surfaces 66d, 68d of the respective disk halves 62d, 64d. Here the one disk half 62d has a first annular connecting region 92d, which, as shown in FIG. 11, is connected to a corresponding second annular connecting region 94d of the other disk half 64d by a concentrically extending annular weld 96d.

As seen in FIG. 12, the one disk half 62d, before assembly, has a contact incline 98d distant from the peripheral surface 50d at preferably 45°, whereas the other disk half 64d, instead of a matching contact surface, has a step 102d extending orthogonally to an annular surface 100d near the periphery and extending concentrically with the peripheral surface 50d, which step on being joined comes to rest against the contact incline 92d by its annular contact edge 104d, whereby the disk halves 62d, 64d are centered on each other. However, it is not ruled out here that instead of the encircling steps 102d, step segments, or single areas of contact, may be provided.

Then the two disk halves 62d, 64d are welded together under pressure, the step 102d being fused by its contact edge 104d (connecting region 94d) to the contact incline 98d (connecting region 96d), and the two disk halves 62d, 64d securely connected together.

Additionally, again, the two disk halves 62d, 64d may be welded together in the region of the web 86d.

As is seen in FIG. 12, the relief-like depressions 72d, which in completed condition form the passages 78d, are made deeper in the disk half 64*d* —provided with the step 102*d* —corresponding approximately to the height of the step 102*d*, to enable the wire components to be threaded in during assembly and to achieve a reliable seal.

The welding is done not only between the contact incline 98*d* and the step 102*d*, but of course also where the wires go through the passages indicated at the top and bottom in FIG. 12. In this way, a complete sealing of the passages 78*d*, and of the interior 76*d*, is achieved.

The disk halves 62*d* and 64*d* are preferably poured as stainless steel castings and then heat treated. In the casting operation, the conformation shown in FIGS. 10, 11 and 12 is obtained.

We claim:

1. A kitchen utensil, comprising a handle part, a shank part joined to the handle part, an active part joined to the shank part at a juncture with the shank part spaced apart from the handle part, and a transition part spaced apart from the handle part, the shank part having at least one shank part component and the active part having at least one active part component, at least one of the at least one shank part component and the at least one active part component being of elongate material and having an embedded portion embedded in the transition part, the transition part being composed of two separately produced component members having contacting surfaces along their perimeters that are in sealed contact with each other, the at least one embedded portion being received in a receiving cavity formed in at least, one of the component members of the transition part through an opening in the transition part having an axis lying substantially at or adjacent a juncture of the contacting surfaces of the component members, the embedded portion being in sealed relation with the opening in the transition part, the cavity in the at least one of the component members defining in the at least one of the component members a portion of reduced wall thickness in a direction transverse to the contacting surface, and the transition part having an external surface substantially free of irregularities resulting from formation of the receiving cavity.

2. The kitchen utensil as claimed in claim 1, wherein the receiving cavity has a blind end inside the transition part and the embedded portion has an end engaging the blind end of the cavity.

3. The kitchen utensil according to claim 1, wherein the receiving cavity has an entrance opening and an exit opening and the embedded portion is an intermediate portion of the at least one of the at least one shank component and the at least one active component, said intermediate portion lying between continuations located outside of the transition part.

4. The kitchen utensil as claimed in claim 1, wherein said elongate material of at least one of the at least one shank component and the at least one active component is a wire material having a diameter of about 3 mm.

5. The kitchen utensil as claimed in claim 1, wherein the handle part has a diameter of about 15 mm.

6. The kitchen utensil as claimed in claim 1, wherein the total length of the handle part, the shank part and the active part is about 300 mm.

7. The kitchen utensil as claimed in claim 1, wherein the transition part has in a direction transverse to a lengthwise extent of the shank part a maximum dimension of about 25 mm.

8. The kitchen utensil as claimed in claim 1, wherein the ratio of the length of the shank part to the length of the handle part is about 1:1.

9. The kitchen utensil as claimed in claim 1, wherein both component members have recesses located in opposed relation that jointly define the receiving cavity for accommodating the embedded portion.

10. The kitchen utensil as claimed in claim 1, wherein the embedded portion has a cross section of a size and shape corresponding substantially to the size and shape of the receiving cavity.

11. The kitchen utensil as claimed in claim 1, wherein the elongate material is a wire material.

12. The kitchen utensil as claimed in claim 1, wherein the elongate material is circular in cross section.

13. The kitchen utensil as claimed in claim 1, wherein the at least one shank part component enters the handle part substantially coaxial or paraxial thereto through a terminal surface of the handle part.

14. The kitchen utensil as claimed in claim 1, wherein the handle part has a cylindrical external surface.

15. The kitchen utensil as claimed in claim 1, wherein the at least one active part component and the at least one shank part component have integral portions located inside the transition part.

16. The kitchen utensil as claimed in claim 1, wherein the at least one shank part component and the at least one active part component are separate from each other and are interconnected by the transition part.

17. The kitchen utensil as claimed in claim 1, wherein the number of shank part components of the shank part entering the transition part are different from the number of active part components of the active part entering the transition part.

18. The kitchen utensil as claimed in claim 1, wherein the number of shank part components of the shank part entering the transition part is less than the number of active part components of the active part entering the transition part.

19. The kitchen utensil as claimed in claim 1, wherein the shank part has two shank part components defining a shank part plane, and the active part has a plurality of active part components, at least portions of which lie in the shank part plane.

20. The kitchen utensil as claimed in claim 1, wherein the shank part and the active part are made of wire material, and at least a portion of the wire material forming the active part has a cross-sectional area different from the cross-sectional area of the wire material forming the shank part.

21. The kitchen utensil as claimed in claim 1, wherein the shank part and the active part are made of wire material and the active part includes an active part component having a cross-sectional area less than the cross-sectional area of the shank part.

22. The kitchen utensil as claimed in claim 1, wherein the transition part is displaceable along the shank part.

23. The kitchen utensil as claimed in claim 1, wherein the transition part is affixed to the shank part.

24. The kitchen utensil as claimed in claim 1, wherein the embedded portion of said at least one of said active part component and of said at least one shank part component is anchored by anchoring means within said transition part.

25. The kitchen utensil as claimed in claim 24, wherein the anchoring means includes at least one of a kink and a constriction cooperating with an engaging formation of the receiving cavity.

26. The kitchen utensil as claimed in claim 1, wherein portions of a plurality of shank part components and active part components lie in a substantially common plane inside the transition part.

27. The kitchen utensil as claimed in claim 1, wherein the at least one receiving cavity is channel-shaped, and the embedded portion substantially completely fills the channel-shaped receiving cavity.

28. The kitchen utensil as claimed in claim 1, wherein the component members of the transition part are joined by at least one member of the group consisting of a bonding agent, a solder, and a weld.

29. The kitchen utensil as claimed in claim 1, wherein the transition part is configured as one of a disk member or a spherical member or a teardrop member or a pear-shaped member.

30. The kitchen utensil as claimed in claim 1, wherein the transition part is a disk having one of a circular or oval or elliptical profile and having a median disk plane, a peripheral surface substantially orthogonal to the median disk plane, and one of substantially plane end surfaces or slightly convex curved end surfaces substantially parallel to the median disk plane.

31. The kitchen utensil as claimed in claim 1, wherein the diameter-thickness ratio of the disk is in the range of from about 3:1 to about 5:1.

32. The kitchen utensil as claimed in claim 1, wherein the contacting surfaces of the component members coincide substantially with a median disk plane.

33. The kitchen utensil as claimed in claim 1, wherein at least one of the transition part, the shank part, the handle part and the active part is made of stainless steel.

* * * * *